United States Patent
Ejiri et al.

(10) Patent No.: US 6,558,772 B2
(45) Date of Patent: May 6, 2003

(54) MAGNETIC RECORDING MEDIUM AND METHOD OF MANUFACTURING SAME

(75) Inventors: Kiyomi Ejiri, Kanagawa (JP); Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 85 days.

(21) Appl. No.: 09/885,558

(22) Filed: Jun. 20, 2001

(65) Prior Publication Data

US 2002/0037436 A1 Mar. 28, 2002

(30) Foreign Application Priority Data

Jun. 21, 2000 (JP) ........................................ 2000-185591

(51) Int. Cl.$^7$ .............................................. G11B 5/712
(52) U.S. Cl. ........................ 428/141; 428/323; 428/328; 428/329; 428/336; 428/694 BH; 428/694 BS
(58) Field of Search ................................ 428/323, 328, 428/329, 336, 694 BH, 694 BS, 141

(56) References Cited

U.S. PATENT DOCUMENTS 6,136,410 A * 10/2000 Okamoto et al. ............ 428/141
6,162,528 A * 12/2000 Ochi ............................ 428/141

* cited by examiner

*Primary Examiner*—Stevan A. Resan
(74) *Attorney, Agent, or Firm*—Stroock & Stroock & Lavan LLP

(57) ABSTRACT

Enclosed is a magnetic recording medium obtained by sequentially providing on a flexible nonmagnetic support a nonmagnetic layer comprising a nonmagnetic powder and a binder and a magnetic layer comprising a ferromagnetic powder and a binder. The thickness of the magnetic layer is 0.01–0.1 $\mu$m and the ratio of the exposed area of nonmagnetic power on the surface of the magnetic layer is not greater than 10 percent. A method of manufacturing a magnetic recording medium comprising coating a nonmagnetic layer coating liquid on a flexible nonmagnetic support and applying a magnetic layer coating liquid on the coated layer while the coated layer is still wet. The ratio of the exposed area of nonmagnetic power on the surface of the magnetic layer is not greater than 10 percent; the nonmagnetic layer coating liquid has a yield stress of not less than 100 $\mu$N/cm$^2$ or 10 dyne/cm$^2$ and the solid component concentration of the magnetic layer coating liquid is greater than the solid component concentration of the nonmagnetic layer coating liquid. A particulate magnetic recording medium having a magnetic layer of not greater than 0.1 $\mu$m, good production properties, and good electromagnetic characteristics when used with MR heads is provided.

6 Claims, No Drawings

MAGNETIC RECORDING MEDIUM AND METHOD OF MANUFACTURING SAME

FIELD OF THE INVENTION

The present invention relates to magnetic recording media, and more particularly, to a magnetic recording medium having a magnetic layer and a nonmagnetic layer that is capable of high-density recording, and a method of manufacturing the same.

RELATED ART

Conventionally, magnetic recording media in which a magnetic layer—comprising a ferromagnetic iron oxide, cobalt-modified ferromagnetic iron oxide, $CrO_2$, a ferromagnetic alloy powder, or the like, dispersed in a binder—is coated on a nonmagnetic support, have been widely employed as video tapes, audio tapes, and magnetic discs. In recent years, the trend has been toward high density and shorter recording wavelengths, and the problems of self-demagnetization loss, whereby output decreases as the thickness of the magnetic increases, and loss of thickness during reproduction have become substantial. Thus, the magnetic layer has been made thinner. However, when the magnetic layer is thinned to about 2 μm or less, the nonmagnetic support member tends to affect the surface of the magnetic layer, with a tendency toward deterioration of electromagnetic characteristics and dropout.

Japanese Patent Unexamined Publication Nos. Sho 63-191315 and Sho 63-187418 describe methods for solving this problem by employing a simultaneous multilayer coating method to provide a nonmagnetic lower layer and to thinly apply a highly concentrated magnetic coating liquid thereon. These inventions markedly improve yield and achieve good electromagnetic characteristics. However, even higher density magnetic recording media are needed.

The principal magnetic head has been the inductive head, which uses conventional magnetic induction to record and reproduce. However, in recent years, MR heads exploiting changes in magnetic resistance based on the level of magnetization of the medium have become widespread in the area of high-density digital recording, mostly on hard disks, and are becoming more widespread for tapes, flexible disks, and the like employed in high-density recording.

A large amount of research has been conducted and numerous papers have been written on the various problems associated with magnetic recording employing MR heads. However, the great majority of these researches have been on thin metal film media and there has been little research on particulate media having a thin magnetic layer.

The present inventors conducted extensive research into improving the suitability of particulate recording media having good production properties for MR heads. As a result, they found that when high-density recording with MR heads was conducted on a particulate recording medium having a magnetic layer of not more than 0.1 μm in thickness manufactured by a simultaneous multilayer coating method, there were problems in that electromagnetic characteristics (reproduction output and CNR) deteriorated.

Accordingly, the object of the present invention is to provide a magnetic recording medium affording good electromagnetic characteristics with MR heads in the form of a particulate recording medium having good production properties and a magnetic layer not greater than 0.1 μm, and more particularly, to provide a magnetic recording medium affording good recording and reproduction capabilities at short recording wavelengths, as well as good yields.

SUMMARY OF THE INVENTION

The present inventors conducted extensive research into magnetic layer and nonmagnetic layer structures and manufacturing methods achieving the above-stated objects. As a result, they discovered that these objects could be accomplished by a magnetic recording medium which comprises a nonmagnetic layer comprising a nonmagnetic powder and a binder and a magnetic layer comprising a ferromagnetic powder and a binder provided in this order on a flexible nonmagnetic support, wherein said magnetic layer is 0.01–0.1 μm in thickness and a ratio of an exposed area of said nonmagnetic powder appeared on said magnetic layer surface is equal to or less than 10 percent.

In the magnetic recording medium of the present invention, recording and reproduction capabilities at short recording wavelengths are desirably further improved by employing an acicular alloy powder with a major axis length of not greater than 0.1 μm or a hexagonal ferrite magnetic powder with a plate diameter of not greater than 40 nm as the ferromagnetic powder incorporated into the magnetic layer.

The use of an MR head at least during reproduction is a prerequisite of the magnetic recording medium of the present invention.

The present invention also relates to the magnetic recording medium obtained by a method of manufacturing a magnetic recording medium exhibiting a ratio of an exposed area of a nonmagnetic powder to be contained in a nonmagnetic layer on the surface of a magnetic layer is equal to or less than 10 percent, which comprises forming a magnetic layer by coating a coating liquid for a nonmagnetic layer on a flexible nonmagnetic support, followed by coating a coating liquid for a magnetic layer while the coated nonmagnetic layer is in a wet-state, wherein said coating liquid for nonmagnetic layer has a yield stress equal to or higher than 100 $\mu N/cm^2$ (10 $dyne/cm^2$) and the solid component concentration of said coating liquid for magnetic layer is greater than the solid component concentration of said coating liquid for nonmagnetic layer.

The present invention will be described next.

MR heads achieve greater reproduction output than inductive heads. With conventional inductive heads, research has been conducted into increasing residual magnetization in the magnetic layer; with MR heads, by contrast, it is known that this leads to increased noise and that high residual magnetization is not necessarily related to enhanced performance. In thin metal film media employed in hard disks, research has been conducted into thinning the magnetic layer to several tens of angstroms to reduce magnetization. However, when applying magnetic particles, thinning of the magnetic layer is limited by the size of the magnetic particles. That is, the size at which magnetization of the magnetic particles is thermally stable is the limit to layer-thinning and is about 0.01 μm. Due to such particularities of particulate media, saturation of the MR head is prevented in the present invention by limiting the thickness of the magnetic layer to not less than 0.01 μm and not greater than 0.1 μm.

Reducing the size of the magnetic particles is known to diminish noise and increase the CNR. However, it was found that, when forming on a nonmagnetic layer a thin magnetic layer as set forth above comprising a magnetic powder of micro-particles, the nonmagnetic powder contained in the nonmagnetic layer tends to become exposed on the magnetic layer surface during coating and drying processes, and this exposure of the nonmagnetic powder on the magnetic layer surface compromises electromagnetic characteristics. Accordingly, in the present invention, the ratio of the exposed area of nonmagnetic powder (powder to be incorporated into the nonmagnetic layer) on the magnetic layer surface is controlled to equal to or less than 10 percent.

Further, the reason why the nonmagnetic powder contained in the nonmagnetic layer tends to be exposed on the magnetic layer surface during coating and drying processes is thought to be that the small particle diameter of the magnetic particles causes them to be pushed aside by nonmagnetic particles moving toward the surface during coating and drying processes. To suppress this phenomenon, in the manufacturing method of the present invention, a coating liquid with a large (that is, with a large force required to bring about flowing of the particles) yield stress of not less than 100 $\mu N/cm^2$ or 10 dyne/$cm^2$ is employed as the nonmagnetic layer coating liquid, and the solid component concentration of the magnetic layer coating liquid is made higher than that of the nonmagnetic layer, thereby increasing resistance of the magnetic layer to movement of nonmagnetic powder in the nonmagnetic layer.

The magnetic layer will be described in detail.

In the present invention, the average thickness d of the magnetic layer is 0.01–0.1 $\mu$m, preferably 0.03–0.08. When the magnetic layer is thinner than 0.01 $\mu$m, it essentially no longer functions as a magnetic layer. When the magnetic layer exceeds 0.1 $\mu$m in thickness, so-called self-demagnetization loss increases and when the $\sigma$s of the magnetic material is high, saturation on the MR head tends to easily occur.

One or multiple magnetic layers may be employed to achieve the stated objects. When multiple magnetic layers are employed, the technique described in Japanese Patent Unexamined Publication No. Hei 6-139555 may be applied, for example.

The ferromagnetic powder employed in the present invention is desirably an acicular alloy magnetic powder with a major axis length of not more than 0.1 $\mu$m, preferably not more than 0.08 $\mu$m, or a hexagonal ferrite ferromagnetic powder with a plate diameter of not more than 40 nm, preferably not more than 35 nm.

When employing an acicular alloy powder, the Hc is not less than 159 kA/m (2,000 Oe), preferably not less than 175 kA/m (2,200 Oe), with the higher the level the better from the viewpoint of recording. However, from the viewpoint of the capability of the recording head, from 175 kA/m (2,200 Oe) to 279 A/m (3,500 Oe) is suitable. The $\sigma$ s is from 90 $A \cdot m^2$ kg to 160 $A \cdot m^2$/kg, preferably 95–150 $kA \cdot m^2$/kg, and still more preferably 100–140 $A \cdot m^2$/kg. The acicular ratio is 3–15 and preferably 5–10. The mean particle volume is 1,500–15,000 $nm^3$, preferably 2,000–12,000 $nm^3$, and still more preferably, 3,000–10,000 $nm^3$. When employing hexagonal ferrite, the Hc is preferably within the same range as for acicular metal alloy powder. The s s is 45–75 $A \cdot m^2$ kg, preferably 50–70 $A \cdot m^2$/kg. The plate ratio (plate diameter/thickness) is 2–15, preferably 3–8. The mean particle volume is 2,000–12,000 $nm^3$, preferably 3,000–10,000 $nm^3$.

In addition to prescribed atoms, the following atoms can be contained in the ferromagnetic alloy powder: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and the like. Particularly, the addition of 5–40 weight percent of Co, Sm, Nd, or the like relative to Fe is known to increase the Hc. Prior to dispersion, the magnetic powder may be pretreated with dispersing agents, lubricants, surfactants, antistatic agents, and the like.

Known binders, such as those described in Japanese Patent Nos. 2,566,096 and 2,571,351, may be employed in the magnetic layer. These binders desirably contain functional groups such as $SO_3M$ and $PO_3M$ for promoting adsorption onto the magnetic powder, as well as epoxy groups. The molecular weight thereof is 10,000–100,000, preferably 20,000–60,000. The quantity employed is 5–25 parts, preferably 5–20 parts, and still more preferably 5–15 parts with respect to 100 parts by weight of magnetic powder.

Known abrasives such as $\alpha$-alumina and $Cr_2O_3$ may be incorporated into the magnetic layer. A mean particle diameter the abrasives is preferably not less than ⅓ and not more than ten times the thickness of the magnetic layer in a wet/wet application. Excessively large mean particle diameter causes noise and dropout. In addition, solid lubricants such as carbon black with a particle diameter of not less than 30 nm, fatty acids, fatty esters, and liquid lubricants may also be employed in the magnetic layer.

In the present invention, since a thin magnetic layer results in saturation recording, less variation in the thickness of the magnetic layer is ideal; however, a relation between the thickness d of the magnetic layer and the standard deviation of the magnetic layer of $\sigma a/d \leq 0.5$ is permissible in practice; $\sigma/d \leq 0.3$ is preferred. To reduce $\sigma$, as described in Japanese Patent No. 2,566,096, it is known that the lower layer nonmagnetic coating liquid is made thixotropic and that acicular magnetic powder is used in the lower layer. The above-cited patent also discloses the technique of rendering uniform the interface between the magnetic layer and the nonmagnetic layer in a magnetic layer having a thickness ranging from 0.01 to 0.3 $\mu$m. However, at below 0.1 $\mu$m, not only the uniformity of the interface is important, but the phenomenon whereby a portion of the particles of the nonmagnetic powder (in units of from 1 to several tens) are exposed on the surface of the magnetic layer contributes to increased noise. In the present invention, increased noise will be inhibited by specifying the ratio of the exposed area of particles employed in the nonmagnetic lower layer that are exposed on the surface of the magnetic layer as being not greater than 10 percent, preferably not greater than 8 percent, and still more preferably not greater than 6 percent.

The lower layer nonmagnetic layer will be described next in detail.

The nonmagnetic powder employed in the nonmagnetic layer in the present invention can be selected from inorganic compounds such as metal oxides, metal carbonates, metal sulfates, metal nitrates, metal carbides, metal sulfides, and the like. Examples of inorganic compounds are: $\alpha$-alumina having an $\alpha$-conversion rate or not less than 90 percent, $\beta$-alumina, $\gamma$-alumina, silicon carbide, chromium oxide, cerium oxide, $\alpha$-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfate; these may be employed alone or in combination. Particularly preferred are titanium dioxide, zinc oxide, iron oxide, and barium sulfate. Of even greater preference are titanium dioxide and $\alpha$-iron oxide. The particle size of these nonmagnetic powders desirably ranges from 0.005 to 2 $\mu$m. Nonmagnetic powders of differing particle sizes may be combined as needed, or a single nonmagnetic powder with a wide particle diameter distribution may be employed to achieve the same effect. The particle size of greatest preference is from 0.01 to 0.2 μm. The shape may be acicular or platelike, with an acicular shape being particularly preferred.

The nonmagnetic powder suitably has a tap density of 0.05–2 g/mL, preferably 0.2–1.5 g/mL. A moisture content of 0.1–5 weight percent, preferably 0.2–3 weight percent, is suitable. The pH can be 2–11, with a level of between 6 and 9 being particularly preferred. The specific surface area is 1–100 $m^2/g$, preferably 5–50 $m^2/g$, and more preferably 7–40 $m^2/g$. The crystal size is preferably from 0.01 μm to 2 μm. The DBP oil absorption is 5–100 mL/100 g, preferably 10–80 mL/100 g, and still more preferably 20–60 mL/100 g. The specific gravity is 1–12, preferably 3–6. The shape may be acicular, spherical, polyhedral, or tabular (plate-shaped). The ignition loss is preferably not greater than 20 weight percent. The Mohs scale of hardness of the above-mentioned inorganic powder employed in the present invention is desirably not less than 4. The roughness factor of the surfaces of these powders is preferably 0.8–1.5, more preferably 0.9–1.2. The SA (stearic acid) absorption level of the nonmagnetic powder is 1–20 $\mu mol/m^2$, preferably 2–15 $\mu mol/m^2$. The heat of wetting in 25° C. water of the lower nonmagnetic powder desirably falls within the range of from 200 $erg/cm^2$ to 600 $erg/cm^2$. Solvents falling within this heat of wetting range may also be employed. The number of water molecules on the surface at 100–400° C. is suitably 1–10/100 A. The pH of the isoelectric point in water is desirably 3–6.

At least a portion of the surface of these nonmagnetic powders is desirably treated by coating with $Al_2O_3$, $SiO_2$, $TiO_2$, $ZrO_2$, $SnO_2$, $Sb_2O_3$, or ZnO. The coating compounds of preference with regard to dispersion properties are $Al_2O_3$, $SiO_2$, $TiO_2$, and $ZrO_2$, and still more preferably $Al_2O_3$, $SiO_2$, and $ZrO_2$. These may be employed singly or in combination. According to on the object, a coprecipitated surface treatment layer may also be employed, a structure achieved by an alumina treatment followed by treatment of the surface layer with silica, or the reverse, may be adopted. Depending on the objective, the surface treatment layer may be a porous layer, with homogeneity and density being generally desirable.

Specific examples of nonmagnetic powders suitable for use in the present invention are: UA5600 and UA5605 manufactured by Showa Denko K.K.; AKP-20, AKP-30, AKP-50, HIT-55, HIT-100, and ZA-GI manufactured by Sumitomo Chemical Co. Ltd.; G5, G7 and S-1 manufactured by Nippon Chemical Industrial Co. Ltd.; TF-100, TF-120, TF-140, and R516 manufactured by Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha, Ltd.; ECT-52, STT-4D, STT-30D, STT-30, and STT-65C manufactured by Titan Kogyo K.K.; T-1 manufactured by Mitsubishi Materials Corporation; NS-0, NS-3Y, and NS-8Y manufactured by Nippon Shokubai Co. Ltd.; MT-100S, MT-100T, MT-150W, MT-500B, MT-600B, and MT-100F manufactured by Tayca Corporation; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; Y-LOP manufactured by Titan Kogyo K.K.; and sintered products of the same.

Carbon black can be mixed into the nonmagnetic layer to reduce surface resistivity (Rs), a known effect. Examples of types of carbon black that are suitable for this purpose are furnace black for rubber, thermal for rubber, black for coloring, and acetylene black. The specific surface area is 100–500 $m^2/g$, preferably 150–400 $m^2/g$. DBP oil absorption is 20–400 mL/100 g, preferably 30–200 mL/100 g. The particle diameter is 5–80 nm, preferably 10–50 nm, and more preferably 10–40 nm. The preferable is pH being 2–10, moisture content being 0.1–10 percent, and tap density being 0.1–1 g/mL.

Specific examples of types of carbon black suitable for use in the present invention are: BLACK PEARLS 2000, 1300, 1000, 900, 800, 880, 700, and VULCAN XC-72 from Cabot Corporation; #3050B, 3150B, 3250B, #3750B, #3950B, #950, #650B, #970B, #850B, and MA-600 from Mitsubishi Chemical Corp.; CONDUCTEX SC, RAVEN 8800, 8000, 7000, 5750, 5250, 3500, 2100, 2000, 1800, 1500, 1255, and 1250 from Columbia Carbon; and Ketjen Black EC from Lion Akxo Co., Ltd.

The carbon black employed can be surface-treated with a dispersing agent or the like, grafted with a resin, or a portion of the surface may be graphitized. The carbon black may be predispersed with a binder prior to being added to the coating material. These carbon blacks may be employed in a range that does not exceed 50 weight percent of the above-described inorganic powder and does not exceed 40 percent of the total weight of the nonmagnetic layer. These carbon blacks may be employed singly or in combination. The *Carbon Black Handbook* compiled by the Carbon Black Association may be consulted for types of carbon black suitable for use in the present invention.

To keep the exposed area ratio of the nonmagnetic powder to 10 percent or less, the method of manufacturing a magnetic medium of the present invention may be employed. This is a method of manufacturing a magnetic medium comprising forming a magnetic layer by coating a coating liquid for a nonmagnetic layer on a flexible nonmagnetic support, followed by coating a coating liquid for a magnetic layer while the coated nonmagnetic layer is in a wet-state, wherein said coating liquid for nonmagnetic layer has a yield stress equal to or higher than 100 $\mu N/cm^2$ (10 $dyne/cm^2$) and the solid component concentration of said coating liquid for magnetic layer is greater than the solid component concentration of said coating liquid for nonmagnetic layer.

The yield stress of the nonmagnetic lower layer coating liquid is not less than 100 $\mu N/cm^2$ (10 $dyne/cm^2$), preferably not less than 140 $\mu N/cm^2$ (14 $dyne/cm^2$). Methods that may be employed to keep the yield stress of the nonmagnetic lower layer coating liquid within the above-stated range include: (1) adding 10–30 parts of carbon black with a mean primary particle diameter of not greater than 30 nm per 100 parts of the primary component nonmagnetic powder, as disclosed in Japanese Patent No. 2,566,096; (2) employing an acicular nonmagnetic powder with a mean major axis length of not more than 0.2 μm; and (3) employing a solvent (such as cyclohexanone or THF) in which the molecular chains of the binder tend to spread readily (that is, are highly soluble).

Further, the solid component concentration of the magnetic upper layer coating liquid is made higher than the solid component concentration of the nonmagnetic lower layer coating liquid. Specifically, the solid component concentration of the magnetic upper layer coating liquid is preferably made higher than the solid component concentration of the nonmagnetic lower coating liquid by not less than 0.5 percent.

Examples of organic solvents that can be employed in any ratio in the method of manufacturing a magnetic recording medium of the present invention are: ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably not more than 30 percent, more preferably not more than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexane or dioxane) in the nonmagnetic layer. Specifically, it is important that the arithmetic mean value of the upper layer solvent composition is not less than the arithmetic mean value of the lower layer solvent composition. To improve dispersibility, a solvent having a somewhat strong polarity is desirable. It is desirable that solvents having a dielectric constant of 15 or more comprise not less than 50 percent of the solvent composition. Further, the dissolution parameter is desirably from 8 to 11.

A suitable thickness configuration of the magnetic recording medium of the present invention is one in which the flexible nonmagnetic support is 1–100 $\mu$m, preferably 4–80 $\mu$m. The combined thickness of the magnetic layer and the nonmagnetic layer suitably falls within a range of from 1/100 to twice the thickness of the flexible nonmagnetic support. An undercoating layer may be provided between the flexible nonmagnetic support and the nonmagnetic layer to increase adhesion. The undercoating layer is 0.01–2, preferably 0.02–0.5 $\mu$m, in thickness. A backcoat layer may also be provided on the opposite side of the nonmagnetic support from the magnetic layer. The thickness thereof is 0.1–2 $\mu$m, preferably 0.3–1.0 $\mu$m. Known undercoating layers and backcoat layers may be employed.

Known films may be employed as the flexible nonmagnetic support in the present invention, including polyesters such as polyethylene terephthalate and polyethylene naphthalate, polyolefins, cellulose triacetate, polycarbonates, polyamides, polyimides, polyamidoimides, polysulfones, aramids, and aromatic polyamides. These supports may be subjected beforehand to corona discharge treatment, plasma treatment, adhesion-enhancing treatment, heat treatment, dust removal, and the like. Achieving the object of the present invention requires the use of a flexible nonmagnetic support with a centerline average surface roughness (cutoff value: 0.25 mm) of not more than 0.03 $\mu$m, preferably not more than 0.02 $\mu$m, and still more preferably not more than 0.01 $\mu$m. Further, it is desirable that these nonmagnetic supports have low centerline average surface roughnesses, and they also desirably have no coarse protrusions of 1 $\mu$m or greater. The surface roughness profile of the nonmagnetic support may be controlled as desired through the size and quantity of filler that is added to the support. Examples of such fillers are oxides and carbonates of Ca, Si, Ti, and the like, as well as organic micropowders such as acrylics. The F-5 value of the nonmagnetic support employed in the present invention is desirably 5–50 kg/mm$^2$ in the tape running direction and 3–30 kg/mm$^2$ in the tape width direction. The F-5 value in the tape longitudinal direction is generally higher than the F-5 value in the tape width direction unless there is some particular need to increase the strength in the width direction.

The thermal shrinkage rate of the support in the tape running direction and width direction after 30 minutes at 100° C. is preferably 3 percent or less, more preferably 1.5 percent or less. The thermal shrinkage rate after 30 min at 80° C. is preferably 1 percent or less, further preferably 0.5 percent or less. A breaking strength of 5–100 Kg/mm$^2$ and a modulus of elasticity of 100–2,000 Kg/mm$^2$ are desirable in both directions.

In addition to employing a nonmagnetic coating liquid with a yield stress of not less than 100 $\mu$N/cm$^2$ or 10 dyne/cm$^2$ and making the solid component concentration of the magnetic layer coating liquid greater than the solid component concentration of the nonmagnetic layer, the method of manufacturing the magnetic coating material of the magnetic recording medium of the present invention also comprises at least a kneading step, a dispersing step, and a mixing step provided as needed before and/or after these other steps. Each of the individual steps may be divided into two or more stages. All of the starting materials employed in the present invention, including the ferromagnetic powder, binders, carbon black, abrasives, antistatic agents, lubricants, and solvents may be added at the beginning of, or during, any of the steps. Moreover, the individual materials may be divided and added during two or more steps; for example, the polyurethane may be divided up and added during the kneading step, the dispersing step, and the mixing step for viscosity adjustment after dispersion.

To achieve the objects of the present invention, conventionally known-manufacturing techniques may of course be utilized for some of the steps. In the kneading step, a kneader having a strong kneading force, such as a continuous kneader or a pressure kneader, may be employed. When a continuous kneader or pressure kneader is employed, the ferromagnetic powder and all or part of the binder (preferably not less than 30 percent of the entire quantity of binder) are kneaded in the range of from 15 to 500 parts of binder per 100 parts of ferromagnetic powder. Details of the kneading process are described in Japanese Patent Unexamined Publication Nos. Hei 1-106338 and Sho 64-79274. When adjusting the lower nonmagnetic layer coating liquid, a dispersing medium having a high specific gravity is desirably employed, with zirconia beads being suitable.

The following are examples of devices and methods for coating a magnetic recording medium having a multilayered structure such as in the present invention:

1. The lower layer is first applied with a coating device commonly employed to apply magnetic coating liquids such as a gravure coating, roller coating, blade coating, or extrusion coating device, and the upper layer is applied while the lower layer is still wet by means of a support pressure extrusion coating device such as is disclosed in Patent Publication No. Hei 1-46186 and Japanese Patent Unexamined Publication Nos. Sho 60-238178 and Hei 2-265672.
2. The upper and lower layers are applied nearly simultaneously by a single coating head having two built-in slits for passing coating liquid, such as is disclosed in Japanese Patent Unexamined Publication Nos. Sho 63-88080, Hei 2-17971, and Hei 2-265672.

3. The upper and lower layers are applied nearly simultaneously using an extrusion coating apparatus with a backup roller as disclosed in Japanese Patent Unexamined Publication No. Hei 2-174965.

To avoid compromising the electromagnetic characteristics or the like of the magnetic recording medium by aggregation of magnetic particles, shear is desirably imparted to the coating liquid in the coating head by a method such as disclosed in Japanese Patent Unexamined Publication No. Sho 62-95174 or Hei 1-236968. In addition, the viscosity of the coating liquid suitably satisfies the numerical range specified in Japanese Patent Unexamined Publication No. Hei 3-8471. Obtaining the magnetic recording medium of the present invention requires strong orientation. The use of a solenoid of not less than 100 mT (1,000 G) and a cobalt magnet of not less than 200 mT (2,000 G) with like poles opposed is preferred. To achieve the highest degree of orientation following drying, predrying to a suitable degree is desirably conducted before orientation. Further, when the present invention is being applied as a disk medium, an orientation method achieving random orientation is rather required. The direction in which the upper magnetic layer and lower magnetic layer are oriented need not necessarily be an in-plane direction in the longitudinal direction; orientation in a vertical or width direction is also possible.

Heat-resistant plastic rollers of epoxy, polyimide, polyamide, polyimidoamide or the like are employed as calender processing rollers. Processing may also be conducted with metal rollers. The processing temperature is preferably not less than 70° C., more preferably not less than 80° C. Linear pressure is desirably 200 kg/cm or more, more preferably 300 kg/cm or more. The friction coefficient for SUS420J of the magnetic layer surface of the magnetic recording medium of the present invention and its opposite surface is preferably not more than 0.5, more preferably not more than 0.3. The surface resistivity is preferably from $10^4$ to $10^{12}$ Ω/sq, the modulus of elasticity at 0.5% elongation of the magnetic layer in both the running direction and the width direction is preferably 100 to 2,000 kg/mm$^2$ and the strength at break is preferably from 1 to 30 kg/cm$^2$. The modulus of elasticity of the magnetic recording medium in both the running direction and the longitudinal direction is preferably from 100 to 1,500 kg/mm and the residual elongation is preferably not more than 0.5 percent. The thermal shrinkage rate at any temperature not greater than 100° C. is preferably not greater than 1 percent, more preferably not greater than 0.5%, and most preferably not greater than 0.1 percent. The glass transition temperature (i.e., the temperature at which the loss elastic modulus of dynamic viscoelasticity peaks when measured at 110 Hz) of the magnetic layer is preferably not less than 50° C. and not more than 120° C., and that of the lower nonmagnetic layer is preferably 0° C.–100° C. The loss elastic modulus preferably falls within a range of from $1\times10^3$ to $8\times10^8$ N/cm$^2$ ($1\times10^4$ to $8\times10^9$ dyne/cm$^2$) and the loss tangent is preferably not more than 0.2. Adhesion failure tends to occur when the loss tangent becomes excessively large.

The residual solvent in the magnetic layer is preferably not more than 100 mg/m$^2$ and more preferably not more than 10 mg/m$^2$, and the residual solvent in the second layer is desirably less than the residual solvent in the first layer. The void ratio in both the lower nonmagnetic layer and the magnetic layer is preferably not more than 30 volume percent, more preferably not more than 20 volume percent. Although a low void ratio is preferable for attaining high output, there are some cases in which it is better to ensure a certain level. For example, in magnetic recording media for data recording where repeat applications are important, higher void ratios often result in better running durability. As regards the magnetic characteristics of the magnetic recording medium of the present invention, when measured under a magnetic field of 398 kA/m (5 KOe), squareness in the tape running direction is not less than 0.70, preferably not less than 0.80, and more preferably not less than 0.90.

Squareness in the two directions perpendicular to the tape running direction is preferably not more than 80 percent of the squareness in the running direction. The switching field distribution (SFD) of the magnetic layer is preferably not more than 0.6. The centerline average surface roughness (cutoff value: 0.25 mm) Ra of the magnetic layer is desirably 1–10 nm, but this value must be suitably adjusted depending on the objective. The lower Ra is, the better the electromagnetic characteristics that are achieved, but from the viewpoint of running durability, the opposite is true. The RMS (rout mean square) of surface roughness RRMS as calculated based on an evaluation by atomic force microscope (AFM) desirably ranges from 2 to 15 nm.

The magnetic recording medium of the present invention comprises a lower nonmagnetic layer and an upper magnetic layer. It will be readily understood that the physical characteristics of the nonmagnetic layer and the magnetic layer can be changed based on the objective. For example, the magnetic layer can be imparted with a high modulus of elasticity to improve running durability while at the same time imparting to the nonmagnetic layer a lower modulus of elasticity than that of the magnetic layer to improve head contact with the magnetic recording medium. What physical characteristics to impart to two or more magnetic layers can be determined by consulting techniques relating to known magnetic multilayers. For example, there are many inventions imparting a higher Hc to the upper magnetic layer than to the lower layer, such as disclosed in Patent Publication No. Sho 37-2218 and Japanese Patent Unexamined Publication No. Sho 58-56228. However, employing a thin magnetic layer as in the present invention permits recording on a magnetic layer of comparatively high Hc.

[Embodiments]

The detailed contents of the present invention are specifically described below through embodiments. In the embodiments, "parts" denote parts by weight.

(1) Nonmagnetic layer

| | |
|---|---|
| Nonmagnetic powder: α-Fe$_2$O$_3$ | 80 parts |
| Mean major axis length | 0.1 μm |
| Acicular ratio | 7.5 |
| Specific surface area by BET | 48 m$^2$/g |
| pH | 8 |
| Fe$_2$O$_3$ content not less than | 90 percent |
| DBP oil absorption | 27–38 mL/100 g |
| Surface treatment agent | Al$_2$O$_3$ |
| Carbon black | 20 parts |
| Mean primary particle diameter | 16 nm |
| DBP oil absorption | 80 mL/100 g |
| pH | 8.0 |
| Specific surface area by BET | 250 m$^2$/g |
| Volatile components | 1.5 percent |
| Vinyl chloride copolymer MR-110 from Nippon Zeon Co., Ltd. | 9 parts |
| Polyester polyurethane resin Neopentyl glycol/Caprolactonepolyol/ MDI = 0.9/2.6/1 containing-SO$_3$Na group 1 × 10$^4$ eq/g Tg | 8 parts 65° C. |
| Butyl stearate | 1 part |
| Stearic acid | 1 part |

-continued

| | |
|---|---|
| Methyl ethyl ketone | 180 parts |
| Cyclohexanone | 80 parts |
| (2) Magnetic layer | |
| Ferromagnetic metal micropowder Composition Fe/Co = 90/10 | 100 parts |
| Hc | 191 kA/m (2,400 Oe) |
| Specific surface area by BET | 58 m$^2$/g |
| Crystallite size | 120 Å |
| Surface coating compound | Al$_2$O$_3$ |
| Particle size (major axis diameter) | 0.06 μm |
| Acicular ratio | 5 |
| σs: | 110 A·m$^2$/kg |
| Vinyl chloride copolymer MR-110 from Nippon Zeon Co., Ltd. | 5 parts |
| Polyester polyurethane resin Neopentyl glycol/Caprolactonepolyol/ MDI = 0.9/2.6/1 containing-SO$_3$Na group 1 × 10$^4$ eq/g Tg | 2 parts |
| | 65° C. |
| a-Alumina (particle size 0.3 μ μm) | 2 parts |
| Carbon black (particle size 0.10 μ μm) | 0.5 part |
| Butyl stearate | 1 part |
| Stearic acid | 3 parts |
| Methyl ethyl ketone | 150 parts |
| Cyclohexanone | 30 parts |
| Toluene | 20 parts |

After kneading the respective components of each of the two coating liquids in continuous kneaders, they were dispersed using zirconia beads in a sand mill. To the dispersion obtained was added polyisocyanate (Coronate L from Nippon Polyurethane Co., Ltd.), three parts to the coating liquid of the lower nonmagnetic layer and one part to the upper magnetic layer. Forty parts of cyclohexanone were added to the coating liquid of the lower nonmagnetic layer and 40 parts of methyl ethyl ketone were added to the coating liquid of the upper magnetic layer, and each liquid was passed through a filter having a mean pore diameter of 1 μm to prepare both nonmagnetic layer and magnetic layer coating liquids. Here, the "solid component" refers to the components remaining after removal of the solvent by evaporation during the drying step. The solid component in the above-described compositions was 28.9 weight percent in the nonmagnetic lower layer and 32.3 weight percent in the magnetic upper layer.

The nonmagnetic coating liquid obtained was coated onto a polyethylene terephthalate support with thickness of 7 μm and a centerline average roughness (cutoff value: 0.25 mm) of 0.01 μm so as to yield a dry thickness of 1.2 μm, after which the magnetic layer was immediately coated thereover so as to yield a dry thickness of 0.05 μm in simultaneously multilayer coating. While the two coated layers were still wet, they were oriented with a rare earth magnet having a magnetic force of 300 mT (3,000 G) and a solenoid having a magnetic force of 150 mT (1,500 G) and dried. They were then processed with a seven-stage calendar comprising only metal rollers at 90° C. to produce an 8 mm tape.

Evaluation Methods (1) Calculation of the Exposed Area Ratio of the Lower Layer Powder A VSM (from Toei Kogyo Co., Ltd.) was used to saturation-magnetize the tape in the longitudinal direction with an external magnetic force of 796 kA/m (10 KOe), after which it was magnetically developed with a magnetic developing solution in which had been dispersed soft magnetic particles with a mean primary particle diameter of not greater than 50 nm. Observation of the developed tape surface by SEM at a magnification of 50,000 revealed that the soft magnetic particles had adhered to the magnetic material but had not adhered to the nonmagnetic lower layer particles or the nonmagnetic particles of the abrasive and the like contained in the magnetic layer. In the embodiment, the abrasive was granular and the lower layer nonmagnetic powder was acicular, so they could be distinguished by shape. The exposed area of the lower layer powder alone was calculated with an analyzer for five visible areas in the SEM image at a magnification of 50,000. When distinction by shape is impossible (for example, when the abrasive is alumina and the lower layer powder is TiO$_2$ or the like), ultimate analysis can be conducted by EPMA to make the distinction.

(2) Output, CNR

Measurement was conducted with a drum tester. The relative speed was 10.5 m/sec. The recording head employed was a MIG head with a Bs of 1.2 T and a gap length of 0.22 μm and a signal at a single frequency (21 MHz) in a recording wavelength of 0.5 μm was recorded at an optimal recording current. The reproduction head employed was an MR head with a 0.2 μm shield gap. The CNR was obtained by calculating the ratio of the reproduction output at 21 MHz to the noise level at a modulation frequency of 2 MHz using a noise spectrum measured by a spectral analyzer from Shibasoku Co., Ltd.

(3) Yield Stress of Coating Liquids

A Rotovisco from Haake Co. was employed to measure the relation between shear rate and shearing stress, and the yield stress was calculated from a Casson Plot.

TABLE 1

| | Emb. 1 | Emb. 2 | Emb. 3 | Emb. 4 | Emb. 5 | Emb. 6 | Emb. 7 | Emb. 8 | Comp. 1 | Comp. 2 | Comp. 3 |
|---|---|---|---|---|---|---|---|---|---|---|---|
| Thickness of magnetic layer (μm) | 0.05 | 0.02 | 0.05 | 0.09 | 0.09 | 0.09 | 0.05 | 0.05 | 0.02 | 0.02 | 0.02 |
| Magnetic material | metal | metal | metal | metal | BaFe | BaFe | metal | metal | metal | metal | BaFe |
| Major axis length or plate diameter (nm) | 60 | 60 | 85 | 60 | 25 | 35 | 60 | 60 | 200 | 130 | 60 |
| Lower layer powder (μm) | AH* | AH | AH | AH | AH | AH | AH | AH | TiO2 particles | TiO2 particles | TiO2 particles |
| Size of lower layer powder (μm) | 0.1 | 0.1 | 0.1 | 0.1 | 0.1 | 0.1 | 0.1 | 0.1 | 0.035 | 0.035 | 0.035 |
| Exposed area rate of lower layer (%) | 2.5 | 5.1 | 4.1 | 0.8 | 1.2 | 2.1 | 7.3 | 6.2 | 14 | 18 | 18 |
| Yield stress of lower layer coating liquid (μN/cm2) | 140 | 140 | 140 | 140 | 140 | 140 | 110 | 170 | 90 | 90 | 90 |
| Solid component concentration of lower layer coating liquid (weight %) | 28.9 | 28.9 | 28.9 | 28.9 | 28.9 | 28.9 | 27 | 31.5 | 34.2 | 34.2 | 34.2 |
| Solid part concentration of | 32.3 | 32.3 | 32.3 | 32.3 | 32.3 | 32.3 | 32.3 | 32.3 | 33.97 | 29 | 23 |

TABLE 1-continued

|  |  | Emb. 1 | Emb. 2 | Emb. 3 | Emb. 4 | Emb. 5 | Emb. 6 | Emb. 7 | Emb. 8 | Comp. 1 | Comp. 2 | Comp. 3 |
|---|---|---|---|---|---|---|---|---|---|---|---|---|
| magnetic upper layer coating liquid (weight %) |  |  |  |  |  |  |  |  |  |  |  |  |
| Coating Method |  | W/W | W/W | W/W | W/W | W/W | W/W | W/W | W/W | W/W | W/W | W/W |
| Evaluation results | Reproduction output (dB) | 3 | 1.5 | 3.8 | 4.8 | 1.8 | 2.1 | 2.8 | 2.5 | 0 | −0.3 | −0.8 |
|  | CNR (dB) | 5.5 | 4.9 | 4.2 | 3.7 | 6.1 | 4.9 | 3.3 | 3.2 | 0 | −0.6 | −0.3 |

*AH = acicular hematite

DESCRIPTION OF EMBODIMENTS AND COMPARATIVE EXAMPLES

Comparative Example 1

Based on evaluation of Embodiments 1–3 of Japanese Patent No. 2,566,096. However, Embodiment 1 differs from Embodiments 1–3 in Japanese Patent No. 2,566,096 in that cyclohexanone was employed as solvent and in that different solid component concentrations of the nonmagnetic layer coating liquid and magnetic layer coating liquid were employed.

Embodiment 1 is a standard sample of the magnetic recording medium of the present invention.

Embodiment 2, with a magnetic layer of 0.02 μm, is a thinner sample than Embodiment 1 (0.05 μm). It corresponds to the magnetic layer thickness of Comparative Example 1. The exposed area ratio of nonmagnetic layer powder is low, so output is higher than in Comparative Example 1. Noise is low so CNR is high.

Embodiment 3 is a sample with a standard magnetic layer thickness and a major axis length of magnetic material of 85 nm. The CNR is slightly lower than that of Embodiment 1.

Embodiment 4 is a sample in which the magnetic layer thickness approaches the upper limit. The output begins to reach saturation due to MR head saturation. Since only noise increases, this embodiment has a lower CNR than the other embodiments.

Embodiment 5 is a sample in which the magnetic material employed in the magnetic layer is BaFe with a plate diameter of 25 nm.

Embodiment 6 is a sample in which the magnetic material is BaFe with a plate diameter of 35 nm in the same manner as in Embodiment 5.

Embodiment 7 is a sample in which 30 parts of cyclohexanone were added to the nonmagnetic layer coating liquid of Embodiment 1 to bring the solid component concentration to 27 percent.

Embodiment 8 is a sample in which 5.3 parts of cyclohexanone were added following dispersion of the nonmagnetic layer coating liquid of Embodiment 1 to bring the solid component concentration to 31.5 percent.

In both Embodiments 7 and 8, the exposed area ratio of the lower layer powder was high, and the CNR was low but still higher than that of the comparative examples.

Comparative Example 2 is an example in which the size of the magnetic material in Comparative Example 1 was reduced. Comparative Example 3 corresponds to Embodiments 2–3 in Japanese Patent No. 2,566,096 when the magnetic material was BaFe (but with the same differences as in Comparative Example 1).

The present invention provides a magnetic recording medium with a magnetic layer of not greater than 0.1 μm and good production properties, as well as good electromagnetic characteristics with MR heads.

The present invention also provides a method of manufacturing a magnetic recording medium in which the exposed area ratio of nonmagnetic powder on the magnetic layer surface is not greater than 10 percent.

What is claimed is:

1. A magnetic recording medium which comprises a nonmagnetic layer comprising a nonmagnetic powder and a binder and a magnetic layer comprising a ferromagnetic powder and a binder provided in this order on a flexible nonmagnetic support, wherein said magnetic layer is 0.01–0.1 μm in thickness and a ratio of an exposed area of said nonmagnetic powder appeared on said magnetic layer surface is equal to or less than 10 percent.

2. The magnetic recording medium of claim 1 wherein said ferromagnetic powder is an acicular alloy powder with a major axis length of not greater than 0.1 μm.

3. The magnetic recording medium of claim 1 wherein said ferromagnetic powder is a hexagonal ferrite magnetic powder with a plate diameter of not greater than 40 nm.

4. The magnetic recording medium of claim 1 wherein said thickness of said magnetic layer ranges from 0.03 μm to 0.08 μm.

5. The magnetic recording medium of claim 1 wherein said ratio of the exposed area of said nonmagnetic powder is equal to or less than 8 percent.

6. The magnetic recording medium of claim 1 wherein said ratio of the exposed area of said nonmagnetic powder is equal to or less than 6 percent.

* * * * *